May 26, 1931.  S. B. GOULD  1,807,525
VEHICLE CONSTRUCTION
Filed July 6, 1929  2 Sheets-Sheet 1
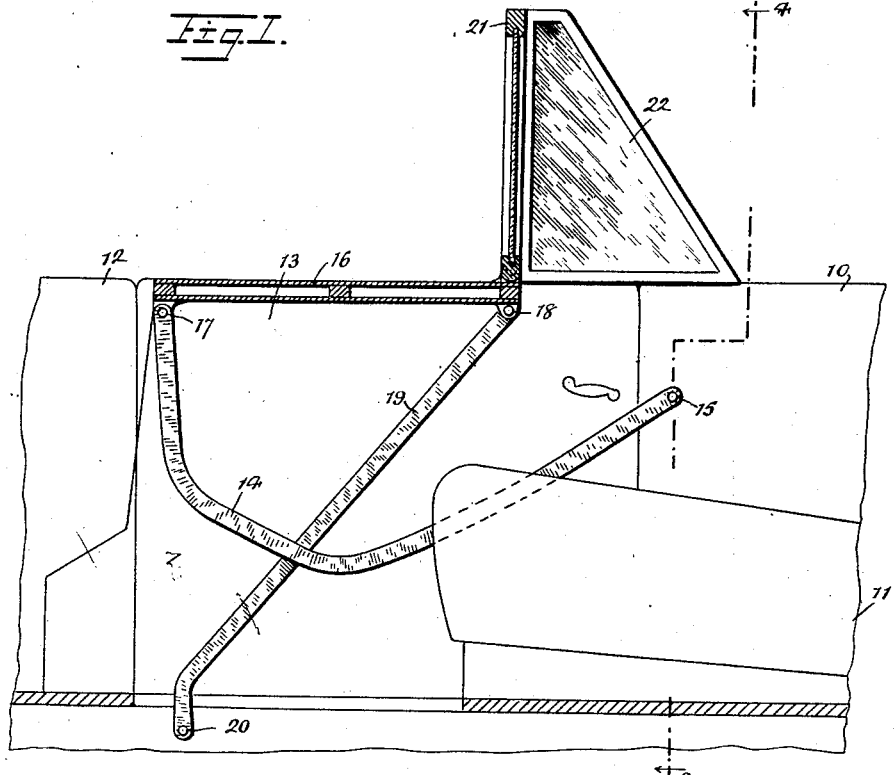
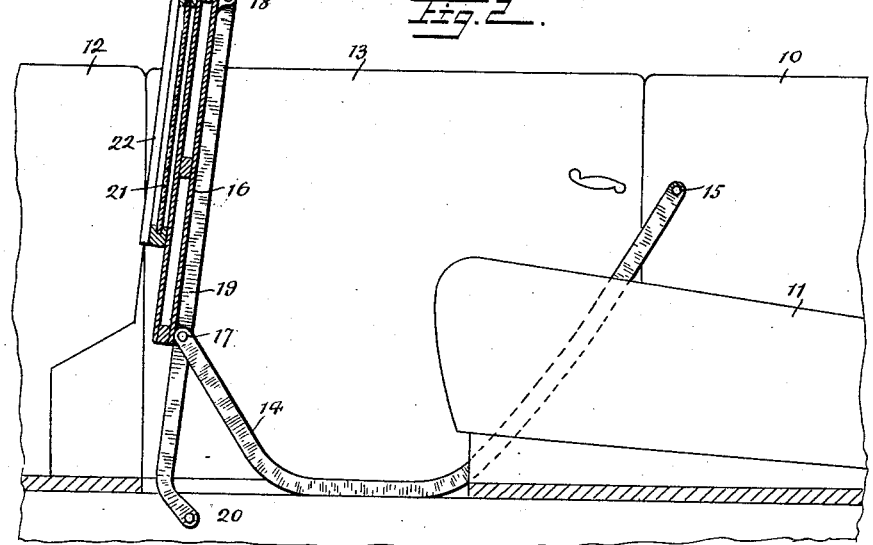
WITNESSES
INVENTOR
S. B. GOULD
BY
ATTORNEYS May 26, 1931.   S. B. GOULD   1,807,525
VEHICLE CONSTRUCTION
Filed July 6, 1929   2 Sheets-Sheet 2
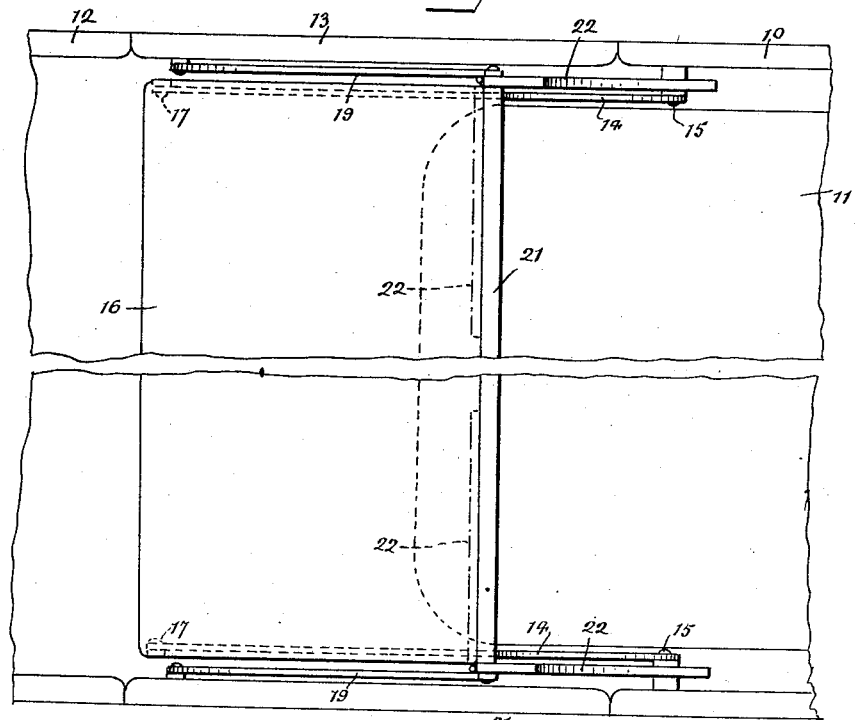
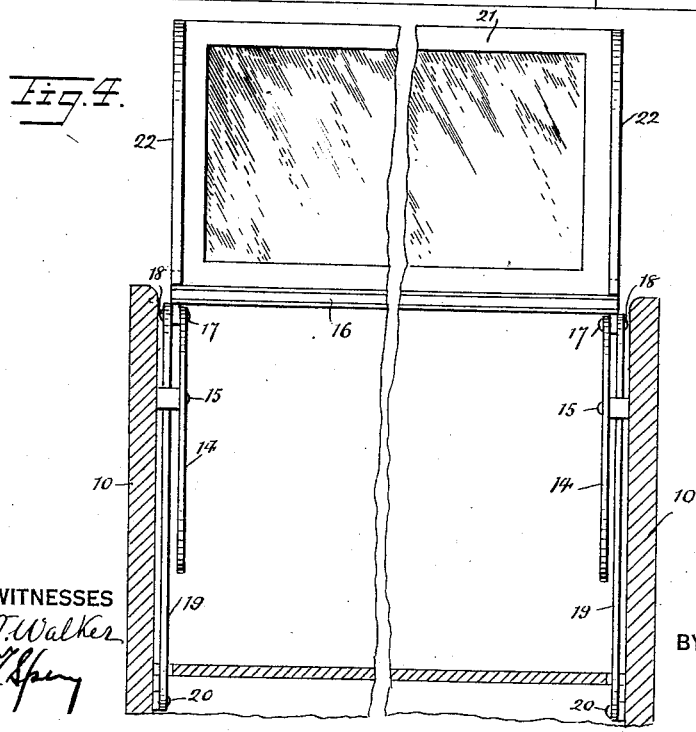
WITNESSES
H. T. Walker
INVENTOR
S. B. GOULD
BY
ATTORNEYS Patented May 26, 1931

1,807,525

UNITED STATES PATENT OFFICE

SIDNEY B. GOULD, OF NEW YORK, N. Y.

VEHICLE CONSTRUCTION

Application filed July 6, 1929. Serial No. 376,366.

This invention relates to vehicle constructions.

It is among the objects of the present invention to provide a novel and improved rear seat cowl for a motor vehicle.

It is a further object of the present invention to provide a novel and improved foldable rear seat cowl which may be arranged in vertical relation within the confines of the vehicle body when not in use.

A further object of the present invention is to provide a novel and improved foldable rear seat cowl which includes foldable central and side windshields which are adapted to be folded in compact position within the vehicle body when not in use.

Other objects of the present invention include the combination and interrelation of parts whereby the whole forms a simple and improved structure well designed to meet the demands of economic manufacture.

Other objects and advantages of the present invention will be apparent from a consideration of the following specification taken in conjunction with the accompanying drawings, in which Figure 1 is a sectional view through a motor vehicle provided with one form of the present invention;

Fig. 2 is a view similar to Fig. 1, showing the device in folded position;

Fig. 3 is a top plan view of the device in operative unfolded position, and

Fig. 4 is a sectional view taken on lines 4—4 of Fig. 1.

Referring more particularly to the drawings, it will be seen that the invention is adapted for use in connection with either fully opened touring cars or in similar cars on which a top is used.

The invention provides not only an improved foldable rear seat cowl, but also provides a foldable windshield, which when in use with the top of the vehicle up, may act to separate the front and rear seats, whereby the vehicle may be used as a limousine or the like.

In connection with the present invention, it will be seen that only one form of the invention is here disclosed, but that the invention is applicable to various types of motor vehicles and that changes and modifications in the construction here depicted to conform the device to other types of vehicle are contemplated in the scope of the invention as outlined in the appended claims.

Referring more particularly to the drawings, the invention is disclosed in combination with a motor vehicle body, which includes sides 10, a rear seat 11, and a front seat 12, the door to the rear seat compartment being indicated by the numeral 13.

Mounted in the rear seat compartment on either side thereof and preferably between the rear seat cushion and the side walls 10 and the door 13, a foldable rear seat cowl-supporting structure is provided, which includes a curved member 14 pivotally secured as at 15 to the side 10 and pivotally associated with the front of the rear seat cowl 16, as indicated at 17, the conformation of the member 14 being such that as indicated in Fig. 2, when the cowl is substantially in a vertical position, the member 14 will be in position with its central portion parallel with the floor of the car, thus permitting access to the rear side compartment through the door. When the cowl 16 is in the horizontal operative position, the member 14 is moved upwardly to support the rear edge of the cowl and to assist in retaining the same in proper horizontal position.

Associated with the rear end of the cowl 16, there is pivotally secured as at 18, a supporting link 19, the opposite end of which is pivotally associated with the vehicle body preferably below the plane of the floor as indicated at 20, the arrangement being such that in the operative position shown in Fig. 1, the link 19 will extend upwardly and rearwardly to prevent downward movement of the rear edge of the cowl and to support the cowl in conjunction with the member 14. The arrangement is such, however, that when desired the rear edge of the cowl may be lifted upwardly, whereby the member 14 and link 19 will swing about their pivoted connections with the body and the front edge of the cowl will move downwardly while the rear edge moves upwardly to bring the cowl to the substantially folded position shown in Fig. 2. It is also to be observed that when the cowl is in the position shown in Figure 2, the members 19 will be in contact with the under side of the cowl, while the intermediate portions of the members 14 are in contact with the floor to thus keep the cowl in place.

Mounted upon the rear edge of the cowl, a foldable front wind shield 21 is provided, which is pivotally mounted to the cowl in any desired manner and upon the ends of which are associated vertically pivoted side windshields 22, the arrangement being such that with the cowl in horizontal position, the front windshield may be raised or lowered as desired, and the side windshields 22 may be extended rearwardly to provide front and side protection to the occupants of the rear seat. In the present device, with the top of the vehicle raised, it will be seen that the windshield 21 acts as an effective divider for the vehicle. Thus the rear seat may be separated from the front seat, and a limousine effect is accomplished.

It will also be seen, as indicated in Fig. 2, that the side windshields may be folded upon the front windshield 21, which in turn may be folded down over the cowl 16, and the cowl then moved with the movement of the link 19 and member 14, to the substantially vertical position shown in Fig. 2, in which position the cowl and associated windshields are compacted folded within the confines of the vehicle and the same may then be utilized as a conventional touring car.

From the foregoing it will readily be seen that the invention provides a simple and efficient motor vehicle accessory, which provides for the shielding and protecting of the rear seat occupants of a touring car in such manner that the shielding may be folded and disposed in small space within the car and be immediately accessible for use by a simple unfolding operation.

As above pointed out, the invention is not confined to the specific structure of the device as herein presented, but that changes and modifications may be resorted to without departing from the spirit or scope of the invention as outlined in the appended claims.

What is claimed is:

1. The combination with a vehicle body, of a cowl, a member at each side of the body and having its lower end pivotally connected with the body below the floor thereof and its upper end pivotally connected with the rear end of the cowl, a second member at each side of said body and having one end pivotally connected with the forward end of said cowl and its other end pivotally connected with the adjacent side of the body, said members serving for the purpose of mounting said cowl for movement to a substantially vertically disposed position and also a horizontally disposed position.

2. The combination with a vehicle body, of a cowl, a member at each side of the body and having its lower end pivotally connected with the body below the floor thereof and its upper end pivotally connected with the rear end of the cowl, a second member at each side of said body and having one end pivotally connected with the forward end of said cowl and its other end pivotally connected with the adjacent side of the body, said members serving for the purpose of mounting said cowl for movement to a substantially vertically disposed position and also a horizontally disposed position, and each of said second members having an intermediate portion which rests upon said floor when said cowl is in the vertical position.

3. The combination with a vehicle, of a rear seat cowl arranged within the confines of the vehicle, a curved supporting member pivotally connected with said cowl on each side thereof, said supporting member having an intermediate portion which is adapted to lie upon and in the plane of the vehicle floor when the cowl is in folded position, and a supporting link pivotally connected with said cowl for preventing downward movement of the rear edge of the cowl when in said position.

4. The combination with a vehicle, of a rear seat cowl arranged within the confines of the vehicle, a curved supporting member pivotally connected with said cowl on each side thereof, said supporting member having an intermediate portion which is adapted to lie upon and in the plane of the vehicle floor when the cowl is in folded position, and a supporting link pivotally connected with said cowl for preventing downward movement of the rear edge of the cowl when in said position, said link being pivoted below the vehicle floor.

Signed at Cold Spring in the county of Putnam and State of New York this 3rd day of July, 1929.

SIDNEY B. GOULD.